United States Patent [19]

Kondo

[11] 3,779,240

[45] Dec. 18, 1973

[54] COMPRESSION PLATE FOR OSTEOSYNTHESIS

[76] Inventor: Shigeru Kondo, 13 Kamibanba-cho, Jodoji, Kyoto, Sakyo-ku, Japan

[22] Filed: Mar. 31, 1972

[21] Appl. No.: 240,243

[52] U.S. Cl. ............................................. 128/92 D
[51] Int. Cl. ........................ A61f 5/04, A61b 17/18
[58] Field of Search ........................ 128/92 D, 92 R

[56] References Cited
FOREIGN PATENTS OR APPLICATIONS

| | | | |
|---|---|---|---|
| 1,505,513 | 11/1967 | France | 128/92 D |
| 462,375 | 10/1968 | Switzerland | 128/92 D |

*Primary Examiner*—Richard A. Gaudet
*Assistant Examiner*—Ronald L. Frink

[57] ABSTRACT

A compression plate for the retention and internal fixation of fragments resulting from a bone fracture. The compression plate is of generally elongate structure and is adapted to be attached to both pieces of the broken bone by screws fitting within slots generally aligned with the length of the compression plate. At least one of the slots in the compression plate is formed with a slot having a taper, generally defined by a portion of the arc of a first hole through the compression plate, a portion of the arc of a second hole through the compression plate, larger in diameter than the first hole and closer to the end of the plate, and lines which are tangential to both holes. The top surface of the tapered slot is preferably chamfered so as to better mate with a screw having a tapered head. Thus, tightening of the screw in the tapered hole causes progression of the compression plate along its axis to encourage and retain the fracture surfaces in firm abutment.

4 Claims, 10 Drawing Figures

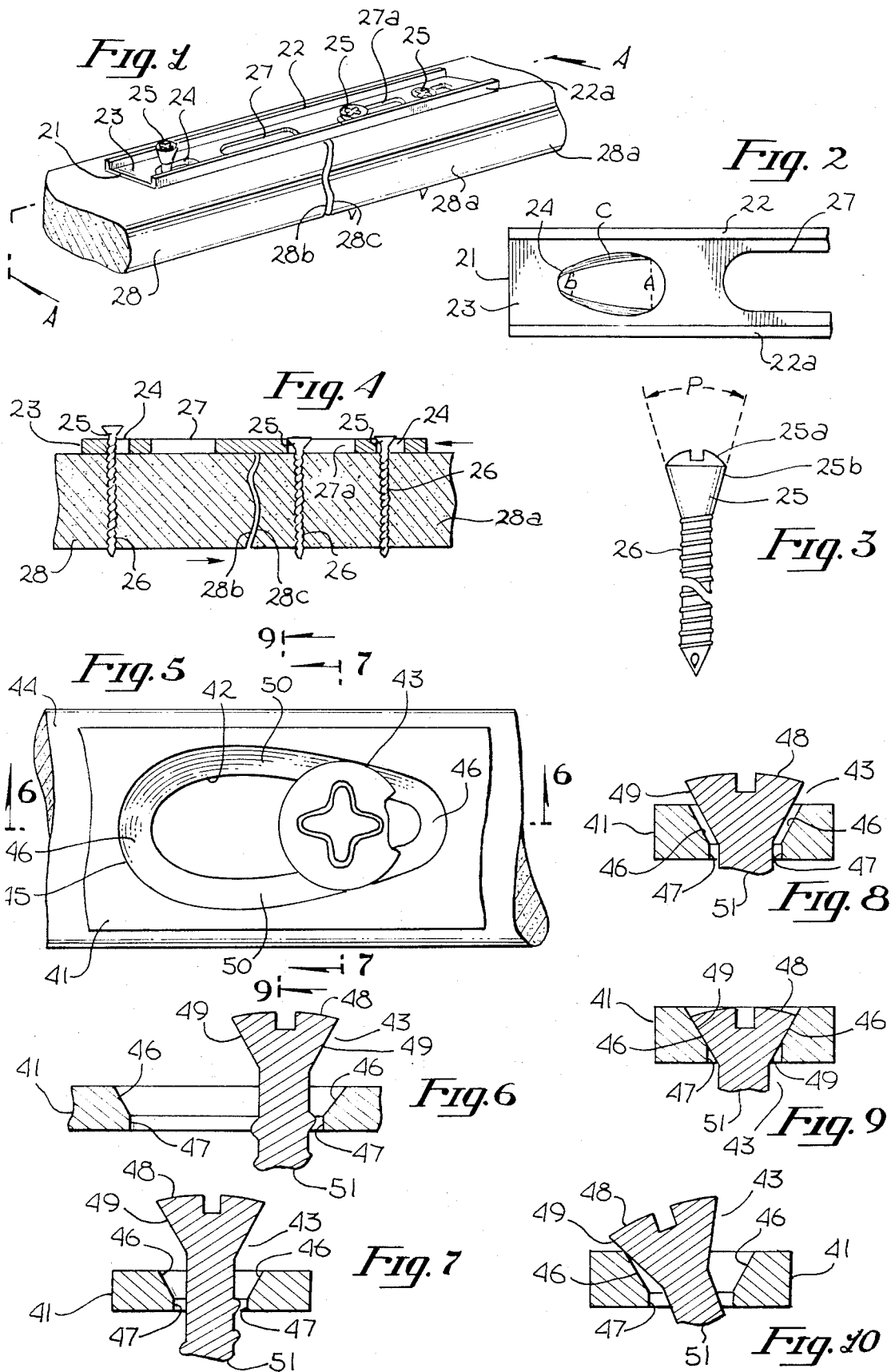

COMPRESSION PLATE FOR OSTEOSYNTHESIS

BACKGROUND OF THE INVENTION

1. Field of the Invention

The present invention relates to the field of surgical devices for use in osteosynthesis.

2. Prior Art

In certain instances broken bone fragments must be mechanically retained one to the other if they are to properly knit. Thus, in cases involving such injuries, an operation is generally performed to expose the bone fragments and to fasten a steel plate to the fragments in a suitable manner to retain the fragments as required.

In the prior art, various devices are known for urging the bone fragments into their proper orientation and to retain them as desired. Typically such devices comprise two major components, the first being the plate which will be permanently attached to the bone, and the second being a means for urging the bone fragments into their proper orientation and which will be removed once the fragments are properly orientated and retained one to the other. By way of example, one such prior art device uses a steel plate having a pair of screw holes adjacent to each end so that two screws may be applied therethrough into the bone fragments to retain the fragments as desired. In use the plate is attached by two screws to one of the bone fragments so as to originally attach the plate thereto. A third screw is attached to the remaining bone fragment, generally remote to the final position of the plate with respect to that fragment, and is used to secure a screw clamp device to that bone fragment. The screw clamp device is adapted to extend from the third screw to one of the remaining pair of screw holes in the plate, so that by manipulation of the screw plate device, the plate and thus the bone fragment attached thereto may be urged into proper knitting position with respect to the second bone fragment. Once in place, a fourth screw is attached to the adjacent bone fragment through the heretofore unused screw hole in the plate and finally the screw clamp device and screw used to retain the device are removed and another screw is attached to the bone fragment through the remaining hole in the plate.

It is to be noted that in the above apparatus, more bone must be exposed than is required to receive the steel plate, a screw must be inserted into the bone which is not used for retaining the plate, but is merely used to provide a bone connection against which the screw clamp device may pull the bone fragments into place, and the apparatus itself tends to be large and clumsy in attachment and use.

BRIEF SUMMARY OF THE INVENTION

A compression plate for the retention and internal fixation of fragments resulting from a bone fracture. The compression plate is of generally elongate structure and is adapted to be attached to both pieces of the broken bone by screws fitting within slots generally aligned with the length of the compression plate. At least one of the slots in the compression plate is formed with a slot having a taper, generally defined by a portion of the arc of a first hole through the compression plate, a portion of the arc of a second hole through the compression plate, larger in diameter than the first hole and closer to the end of the plate, and lines which are tangential to both holes. The top surface of the tapered slot is preferably chamfered so as to better mate with a screw having a tapered head. Thus, tightening of the screw in the tapered hole causes progression of the compression plate along its axis to encourage and retain the fracture surfaces in firm abutment.

Preferably one tapered hole is used at each end of the compression plate, together with a slot at each end of the compression plate to receive a second retaining screw when compression has been accomplished. Substantial compression forces and range of compression may be achieved through the tightening of the screws in the tapered holes at each end of the compression plate, since rotation of the screw tends to eliminate static friction between the screw and the compression plate, thereby aiding in the progression of the compression plate as the screws are tightened.

BRIEF SUMMARY OF THE DRAWINGS

FIG. 1 of the perspective view of one embodiment of the present invention compression plate.

FIG. 2 is a top view of a portion of the compression plate of FIG. 1.

FIG. 3 is a side view of the tapered screw used with the compression plate of the present invention.

FIG. 4 is a cross-section taken along lines 4 of FIG. 1.

FIG. 5 is a top view of a section of the preferred embodiment compression plate showing the sliding hole therein.

FIG. 6 is a cross-section taken along line 6—6 of FIG. 5.

FIG. 7 is a cross-section taken along line 7—7 of FIG. 5.

FIG. 8 is a cross-section of FIG. 7 showing the screw at a further stage of insertion.

FIG. 9 is a cross-section taken along lines 9—9 of FIG. 5 after the screw has been tightened in the sliding hole so as to progress to a wider position of the pear shaped hole to effect compression.

FIG. 10 is a cross-section similar to FIG. 8 illustrating the possible misalignment of the screw with respect to the compression plate.

DETAILED DESCRIPTION OF THE INVENTION

The present invention compression plate has at least one special hole to make compression between the fragments of broken bone by sliding the plate along the bone as a result of tightening of a screw therein. The hole is pear shaped binding a large circle and a small circle with tangent lines. The diameter of the small circle is substantially the same as the overall width of the screw threads, and the diameter of the large circle is designed to be slightly smaller than the diameter of the screw head. The compression plate is used with a screw having a tapered head so that when the screw is inserted vertically at the center of the small circle and tightened, the tapered slope of the screw head presses against the edges of the pear shaped hole. As a result, the screw tends to move toward the center of the large hole, namely toward the middle of the plate, and as a result the plate is forced to move with respect to the screw along the bone shaft, creating the desired compression over the fractured surfaces. The screw, of course, remains both to retain the desired compression and to further aid in retention of the compression plate. In the preferred embodiment, one such pear shaped hole is used adjacent each end of the compression plate with an additional slot of ordinary configuration adjacent thereto, so that two additional screws may be inserted to better retain the bone and compression plate in the desired position.

Thus, the various aspects of one embodiment of the present invention may be seen in FIGS. 1 through 4. In the following, the surgical technique with the present invention plate is instructed. Numeral 21 refers to the internal plate with both edges thickened (22 and 22a) so that a groove is made between 22 and 22a; this groove being identified as 23.

In FIG. 2, the sliding hole is instructed. In this figure "a" refers to the large circle and the small circle is referred to as "b", while 24 identifies the hole itself. The tangential lines binding "a" and "b" are identified as "c" which are filed (chamfered) slightly. In FIG. 3, 25 is the screw head, 25a is the head outer diameter and 25b is the underside, having tapered slope. The angle of the taper is indicated as "p", the included angle of which preferably is 60° to 70° to make the sliding between 25b and "c" smoother. (This screw is hereafter referred to as sliding screw).

After the sliding screw is fully inserted and tightened up to make compression ove the fracture surfaces, an ordinary screw is inserted into ordinary hole (27 and 27a) to affix the plate tightly. These ordinary holes are referred to as fixation holes.

In FIGS. 1 and 4, the bone fragment s are named as 28 and 28a and the fracture surfaces are also named as 28b and 28c. Using the present invention, the tapered slope 25b of the sliding screw 25 and the sliding hole 24 make compression over the fracture surfaces 28b and 28c to close the space. The surgical technique is easy and very simplified when compared with prior art compression plates.

Now referring to FIGS. 5 through 10 the preferred embodiment of the present invention may be seen. This embodiment is very similar in organization, though the plate is considerably thicker to better cooperate with the sliding screws, and the thickened edges have been eliminated. In this improved embodiment, contact of the screw with the compression plate which results in the desired compression is much smoother and the sliding becomes better. Furthermore, the stability of the screw is improved in this embodiment.

In these figures (FIGS. 5 through 10) the compression plate is named as 41 and the sliding hole is 42. As before, the large circle of the sliding hole is "a", while the small circle is "b". A screw to insert into the sliding hole is 43 and the bone fragment is 44.

From FIGS. 5 to 10, it may be seen that the external edge of the hole is 45 and the slope surrounding the hole is 46. This slope fits the taper slope of a screw and internal edge of the slope 47. The slope 50 is the same inclination as slope 46 and as before is preferably in the range of 60° to 70°. In FIGS. 6 and 10, the screw head is 48 and the taper slope is 49; this angle coincides the inclination of 46 and 50. The screw shaft with threads is 51.

From these conditions, there are several merits in the improved sliding hole, when compared with the prior art. They are as follows:

a. An ordinary screw can be used for the sliding screw so long as the taper slope and the slope of the hole edge coincide. A special screw is not necessary in the new hole. (FIG. 6 through 9).

b. As the taper slope of the screw and the inclination of the hole edge coincide, the screw is more stable than the former one (FIG. 9).

c. The screw can be stable even though the screw head 48 is inserted beneath the plate surface (FIG. 9). Accordingly, danger of compression by the screw head against the soft tissue, including the skin, can be avoided. Some parts, where the soft tissues are thin, there is a possibility of necrosis of the skin when compressed by the screw head, (for example, the medial aspect of the lower leg, ulnar side of the forearm, etc., (FIG. 9).

d. It is preferable that the screw be inserted vertically, but in the preferred embodiment sliding hole, some error can be neglected, because the deeper the screw head is inserted, the wider the hole becomes. The sliding can be made even if the screw is inserted a little obliquely, as in FIG. 10.

Thus, it may be seen that by use of the present invention, only the portion of the bone on which the compression plate will be placed need be exposed as a result of an incision, and no screws are required to be applied to the bone other than screws used to retain the compression plate. Substantial compression force as well as range of motion of the compression plate are achieved, and once the compression plate is generally placed in the desired position, compression is quickly and simply accomplished by merely tightening of the screws retaining the plate in the proper sequence, that is, first tightening the screws in the pear shaped holes so as to achieve the desired compression, and then tightening of the remaining holes to accomplish the final retention of the compression plate.

I claim:

1. A compression plate having a top surface, a bottom surface and at least one pear shaped slot therethrough, said slot being generally characterized by a first opening at one end of said slot and a second opening at the second end of said slot, said second opening being greater in width than said first opening, said slot having a horizontal widening starting at said first opening and joining said first and second openings, said slot being bound by a side wall of uniform contour from said one end to said second end thereby defining a pear shaped opening at said top surface which extends continuously downwardly through the plate to terminate in a pear shaped opening at said bottom surface.

2. The compression plate of claim 1 wherein said pear shaped slot has a chamfered area adjacent its upper edges.

3. A compression plate having a top surface, a bottom surface and at least one pear shaped hole therethrough, said hole being generally defined by the horizontal widening of a slot binding with tangent lines a small circle on one end of said slot and a large circle at the other end of said slot, said slot being bound by a side wall of uniform contour from said one end to said other end thereby defining a pear shaped opening at said top surface which extends continously downwardly through the plate to terminate in a pear shaped opening at said bottom surface.

4. The compression plate of claim 3 wherein said pear shaped hole has a chamfered area adjacent its upper edges.

* * * * *